(12) United States Patent
Takeuchi et al.

(10) Patent No.: US 10,936,604 B2
(45) Date of Patent: Mar. 2, 2021

(54) CONSTRUCTING AND SEARCHING STRUCTURED DATA IN A QUESTION-ANSWER DATABASE USING MACHINE LEARNING AND NATURAL LANGUAGE PROCESSING

(71) Applicant: INTERNATIONAL BUSINESS MACHINES CORPORATION, Armonk, NY (US)

(72) Inventors: Hironori Takeuchi, Kanagawa-ken (JP); Hiroaki Nakamura, Kanagawa-ken (JP); Akira Koseki, Kanagawa-ken (JP); Toshinari Itoko, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 16/170,548

(22) Filed: Oct. 25, 2018

(65) Prior Publication Data
US 2020/0134033 A1 Apr. 30, 2020

(51) Int. Cl.
| | |
|---|---|
| *G06F 16/2457* | (2019.01) |
| *G06N 5/02* | (2006.01) |
| *G06N 20/00* | (2019.01) |
| *G06F 16/242* | (2019.01) |
| *G06F 16/245* | (2019.01) |
| *G06F 16/9535* | (2019.01) |

(52) U.S. Cl.
CPC ...... *G06F 16/24578* (2019.01); *G06F 16/243* (2019.01); *G06F 16/245* (2019.01); *G06F 16/9535* (2019.01); *G06N 5/02* (2013.01); *G06N 20/00* (2019.01)

(58) Field of Classification Search
CPC .. G06F 16/954; G06F 16/3314; G06F 16/337; G06F 21/32; G06F 16/24578
See application file for complete search history.

(56) References Cited

U.S. PATENT DOCUMENTS

| | | | |
|---|---|---|---|
| 9,524,320 B2 | 12/2016 | Jamrog et al. | |
| 9,703,860 B2 | 7/2017 | Berajawala et al. | |
| 2003/0149580 A1* | 8/2003 | Moores | G06F 16/954 |
| | | | 705/319 |

(Continued)

*Primary Examiner* — Etienne P Leroux
(74) *Attorney, Agent, or Firm* — Tutunjian & Bitetto, P.C.; Kurt Coudy

(57) ABSTRACT

A computer-implemented method for constructing and searching structured data of question sentences in a question-answer database using machine learning and natural language processing includes receiving one or more question-answer articles as input from one or more question-answer databases over at least one network, extracting one or more profile keywords from a profile associated with a user, assigning a personalization score corresponding to the user to each of the one or more question-answer articles based on the one or more profile keywords, including applying a morphological and dependency analysis to a body section of the question-answer article, receiving a query for obtaining question-answer data relevant to the user, and outputting question-answer data based at least in part on the personalization score of each question-answer article in satisfaction of the query.

18 Claims, 6 Drawing Sheets

(56) References Cited

U.S. PATENT DOCUMENTS

| | | | |
|---|---|---|---|
| 2010/0005081 A1* | 1/2010 | Bennett | G06F 16/3344 704/9 |
| 2016/0196336 A1 | 7/2016 | Allen et al. | |
| 2018/0307749 A1* | 10/2018 | Al Hasan | G06F 16/337 |
| 2020/0034433 A1* | 1/2020 | Cassidy | G06F 21/32 |

\* cited by examiner

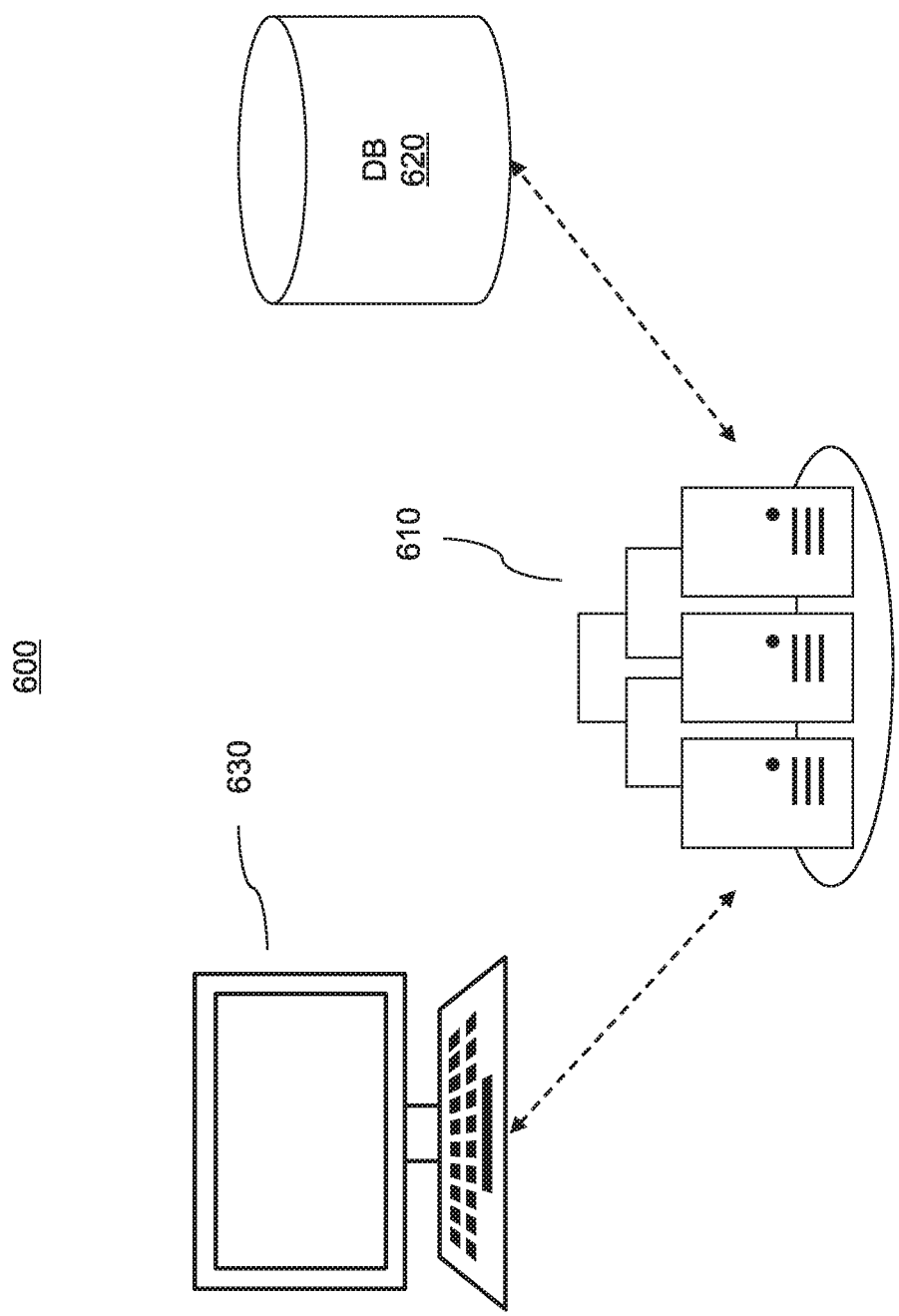

CONSTRUCTING AND SEARCHING STRUCTURED DATA IN A QUESTION-ANSWER DATABASE USING MACHINE LEARNING AND NATURAL LANGUAGE PROCESSING

BACKGROUND

Technical Field

The present invention generally relates to machine learning and natural language processing, and more particularly to constructing and searching structured data in a question-answer database using machine learning and natural language processing.

Description of the Related Art

Question-answering software can provide question-answering services to users over, e.g., the Internet, to find answers to questions. Question-answering software can be offered as a service (e.g., software as a service (SaaS)) or in an open source format. Question-answering websites can include question-answer databases that allow users to submit electronic questions for answering, or answers to those questions posted on the question-answering website.

SUMMARY

In accordance with an embodiment of the present invention, a system for constructing and searching structured data of question sentences in a question-answer database using machine learning and natural language processing is provided. The system includes a memory device for storing program code and at least one processor operatively coupled to the memory device. The at least one processor is configured to execute program code stored on the memory device to receive one or more question-answer articles as input from one or more question-answer databases over at least one network, extract one or more profile keywords from a profile associated with a user, assigning a personalization score corresponding to the user to each of the one or more question-answer articles based on the one or more profile keywords by applying a morphological and dependency analysis to a body section of the question-answer article, and, in response to receipt of a query for obtaining question-answer data relevant to the user, output question-answer data based at least in part on the personalization score of each question-answer article in satisfaction of the query.

In accordance with another embodiment of the present invention, a computer-implemented method for constructing and searching structured data of question sentences in a question-answer database using machine learning and natural language processing is provided. The method includes receiving one or more question-answer articles as input from one or more question-answer databases over at least one network, extracting one or more profile keywords from a profile associated with a user, assigning a personalization score corresponding to the user to each of the one or more question-answer articles based on the one or more profile keywords, including applying a morphological and dependency analysis to a body section of the question-answer article, receiving a query for obtaining question-answer data relevant to the user, and outputting question-answer data based at least in part on the personalization score of each question-answer article in satisfaction of the query.

In accordance with yet another embodiment of the present invention, a computer program product is provided. The computer program product includes a non-transitory computer readable storage medium having program code embodied therewith. The program code are executable by a computer to cause the computer to perform a method for constructing and searching structured data of question sentences in a question-answer database using machine learning and natural language processing. The method performed by the computer includes receiving one or more question-answer articles as input from one or more question-answer databases over at least one network, extracting one or more profile keywords from a profile associated with a user, assigning a personalization score corresponding to the user to each of the one or more question-answer articles based on the one or more profile keywords, including applying a morphological and dependency analysis to a body section of the question-answer article, receiving a query for obtaining question-answer data relevant to the user, and outputting question-answer data based at least in part on the personalization score of each question-answer article in satisfaction of the query.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 is a diagram of an system for constructing and searching structured data of question sentences in a question-answer database, in accordance with an embodiment of the present invention.

DETAILED DESCRIPTION

Due to the large amount of question-answering articles that can be found in question-answering databases, it can be difficult to get a precise understanding regarding what problems, concerns and/or troubles people are having from those question-answering articles. For example, texting mining technology can be used to obtain frequent keywords from which interesting keywords can be manually identified. However, since this naïve approach derives only keywords, it can be difficult to understand what is being described in the actual question-answering articles. Thus, articles corresponding to those keywords would have to be read manually to assess article relevancy (e.g., to determine whether a given person would be interested in a given article).

Furthermore, it can be difficult to personalize articles based on the interest of a person. For example, conventional prioritization approaches can weigh keywords using a model such as, e.g., a term frequency-inverse document frequency (tf-idf) model. However, such an approach is a general prioritization method based on keyword appearance frequency, and does not support personalization of articles on a per-individual basis.

The embodiments described herein provide for systems and methods for constructing and searching structured data of question sentences in a question-answer database. The embodiments described can be used to personalize articles stored in a question-answer database to an individual. For example, from an article including a title, question and answer, the question of the article can be summarized and the article can be personalized for a particular user.

Figure 1:
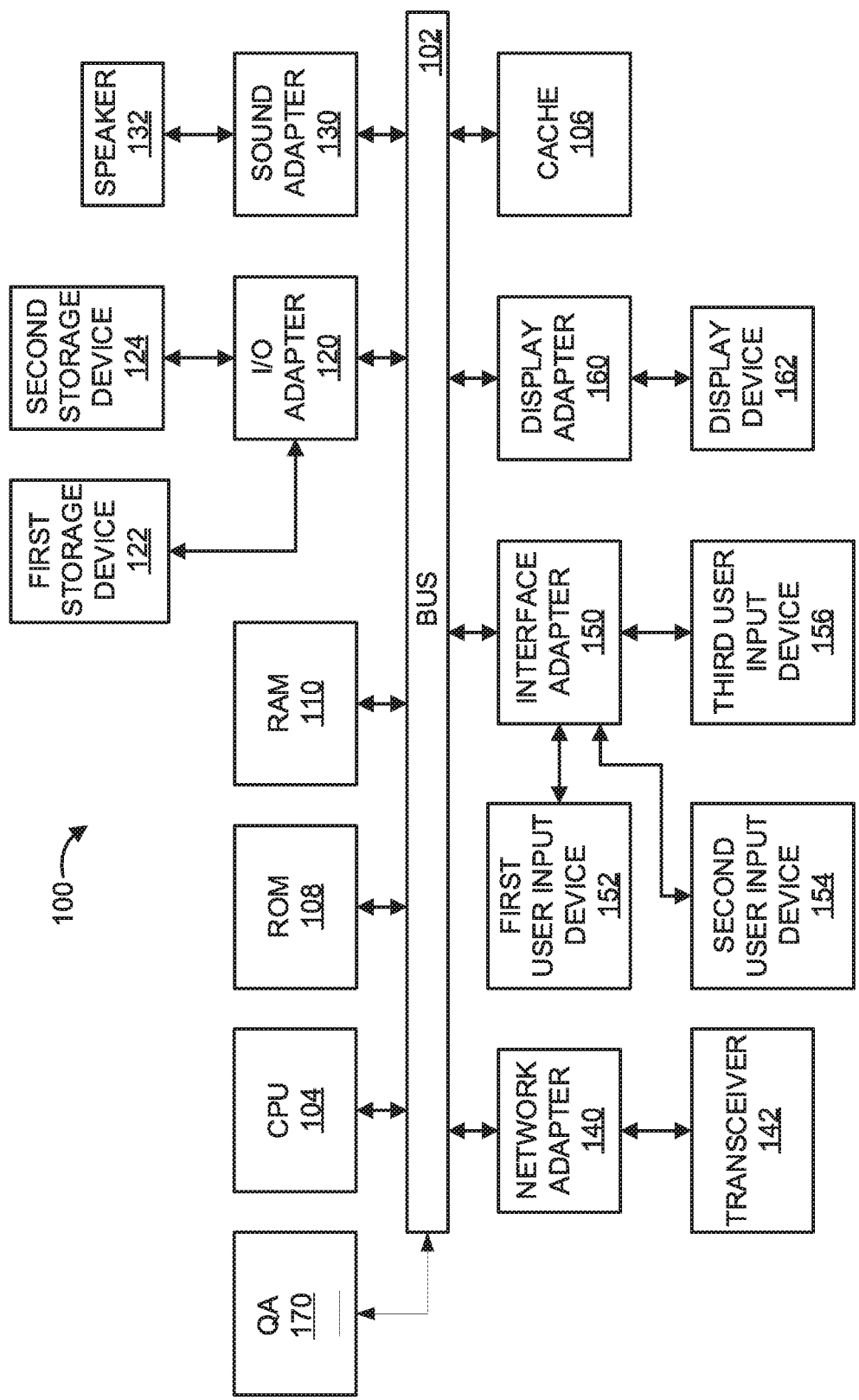
FIG. 1 is a block diagram of a processing system, in accordance with an embodiment of the present invention.

Referring now to the drawings in which like numerals represent the same or similar elements and initially to FIG. 1, an exemplary processing system 100 to which the present invention may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

QA component 170 may be operatively coupled to system bus 102. QA component 170 is configured to perform one or more of the operations described below. QA component 170 can be implemented as a standalone special purpose hardware device, or may be implemented as software stored on a storage device. In the embodiment in which QA component 170 is software-implemented, although the anomaly detector is shown as a separate component of the computer system 100, QA component 170 can be stored on, e.g., the first storage device 122 and/or the second storage device 124. Alternatively, QA component 170 can be stored on a separate storage device (not shown).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
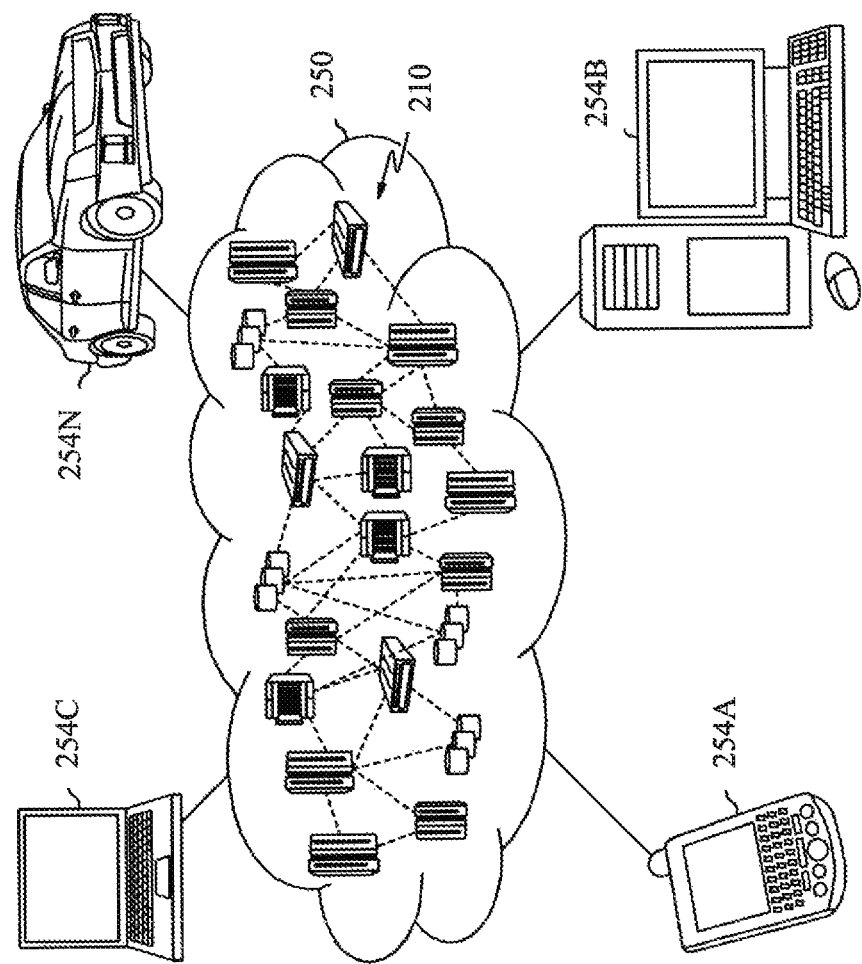
FIG. 2 is a block diagram showing an illustrative cloud computing environment having one or more cloud computing nodes with which local computing devices used by cloud consumers communicate, in accordance with an embodiment of the present invention.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 150 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
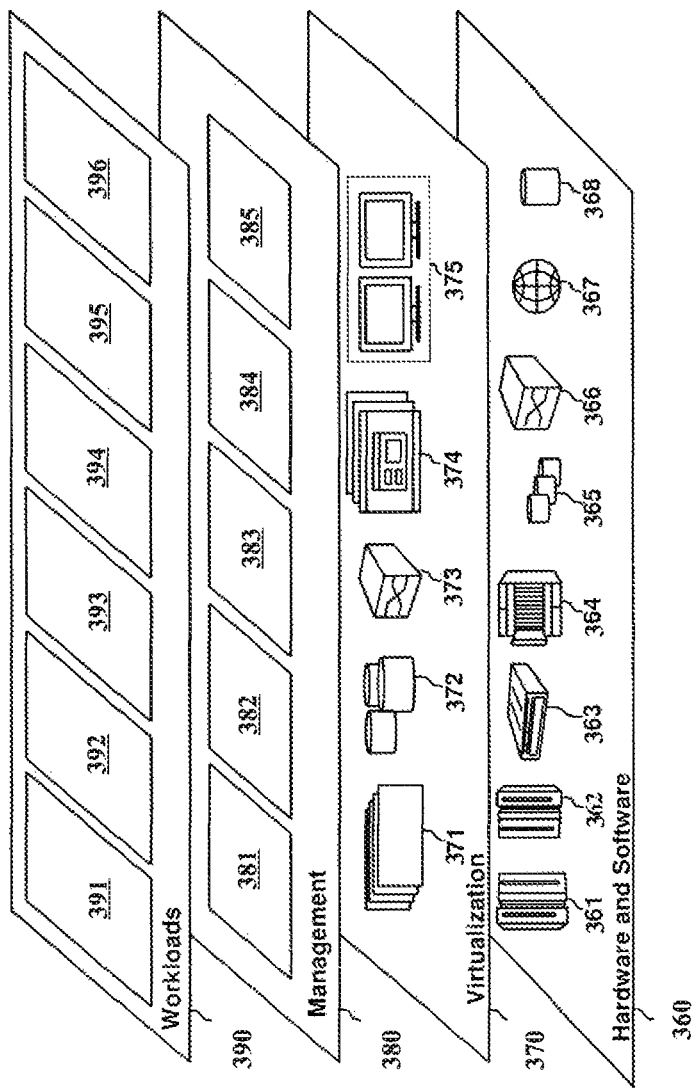
FIG. 3 is a block diagram showing a set of functional abstraction layers provided by a cloud computing environment, in accordance with an embodiment of the present invention.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and database management 396.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
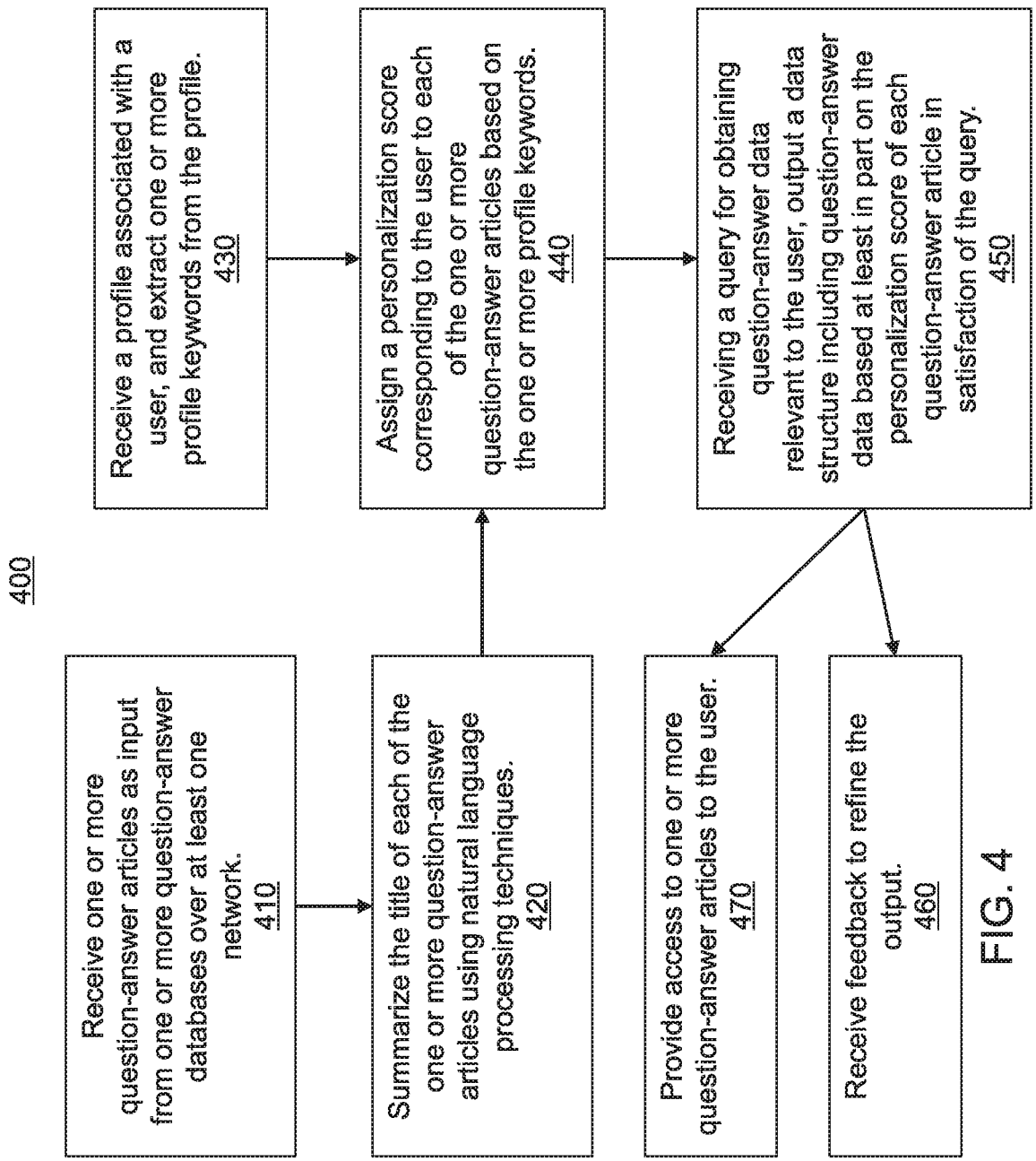
FIG. 4 is a block/flow diagram of a system/method for constructing and searching structured data of question sentences in a question-answer database, in accordance with an embodiment of the present invention.

With reference to FIG. 4, a block/flow diagram is provided illustrating a system/method 400 for constructing and searching structured data of question sentences in a question-answer database using machine learning and natural language processing.

At block 410, one or more question-answer articles are received as input from one or more question-answer databases over at least one network. For example, the one or more question-answer databases can be associated with one or more question-answer websites. Each of the one or more question-answer articles can include a plurality of components, including a title, a question and one or more answers corresponding to the question.

The title can include background information related to the question. The title of the article can be used to organize the article in the context of personalizing the article for a user.

The question includes a body section corresponding to the question. In one embodiment, the question can include one or more additional sections. For example, in addition to the body section, the question can include, e.g., at least one of a greeting section, a background section and a questioner's opinion section. The style and length of each section of the question can be flexible.

Each of the one or more answers can have one or more different features (e.g., different style, length and/or content). Moreover, some of the answers can include imprecise information.

At block 420, the title of each of the one or more question-answer articles is summarized using natural language processing techniques. In one embodiment, summarizing the title can include applying morphological and dependency analyses to the title. For example, a morphological analysis can be applied to the title to identify and extract a main verb from the title, and a dependency analysis can be applied to the title to identify and extract a noun keyword directly associated with the main verb. The noun keyword identified by the dependency analysis is also referred to herein as a core keyword. Then, a longest phrase/clause directly or indirectly modifying the core keyword can be identified and extracted as a modifying phrase. The summary of the title can then include the core keyword and the modifying phrase. A pre-defined question type can be assigned to the title based on keywords in a dictionary (e.g., "who", "what", "when", "why" and "how" keywords).

As an illustrative example of the summarization of the title performed at block 420, the title, "When buying a car, should I show a certificate describing my home address?" can be broken down into components as follows:

"When/buying/a/car,/should/I/show/a/certificate/describing/my/home/address?"

A morphological analysis can identify "show" as the main verb of the title. Based on the main verb "show", a dependency analysis can identify "a certificate" as the core keyword, since "a certificate" is directly associated with the main verb "show". The modifying phrase can be identified as "describing my home address", and the summary can be identified as "a certificate describing my home address". The word "when" can be assigned as the question type for this question (e.g., a "when" question).

At block 430, a profile associated with a user is received, and one or more profile keywords are extracted from the profile. Any suitable machine learning technique (e.g., natural language processing technique) can be used to extract the one or more profile keywords from the profile. The one or more profile keywords can include keywords that relate to personal details of the user. Examples of personal details that the one or more profile keywords can relate to include, but are not limited to, age, gender, marital status, parenthood status, pet owner status, etc.

At block 440, a personalization score corresponding to the user is assigned to each of the one or more question-answer articles based on the one or more profile keywords. In one embodiment, calculating the personalization score can include applying a morphological and dependency analysis to the body section based on the profile associated with the user.

For example, for each of the one or more question-answer articles, assigning the personalization score can include counting a frequency of total cases of each profile keyword found in the body section, counting a frequency of cases where each profile keyword found in the body section occurs as an "is-a" pattern, and calculating the ratio of the frequency of "is-a" pattern cases to the frequency of total cases for each profile keyword found in the body section. The ratio for a given profile keyword found in the body section will be referred to herein as "r".

To illustrate what an "is-a" pattern is, in the sentence "I am a dog owner.", the word "dog" occurs as an "is-a" pattern. However, in the sentence "Your dog bites my hand.", the word "dog" does not occur as an "is-a" pattern. Therefore, the ratio r in this illustrative example for the word "dog" would be ½, or 0.5.

Assigning the personalization score can further include assigning a profile keyword score to each profile keyword found in the body section based on the corresponding ratio, and assigning the personalization score as the sum of all of the profile keyword scores. The value of the profile keyword score for each profile keyword can be determined based on the corresponding ratio. For example, for the given profile keyword, if r is determined to be less than a threshold value, a low profile keyword score can be assigned to the given profile keyword, and if r is determined to exceed the threshold value, a high profile keyword score can be assigned to the given profile keyword.

As an illustrative example, profile keywords in a dictionary can include "woman" and "doctor". The profile keyword score for the term "woman" can be set to $K_1$ and the profile keyword score the term "doctor" can be set to $K_2$. It is assumed for purposes of this example that the threshold value T has been set to 0.7, and the profile keyword score $K_i$ can range between 1 and 5, inclusive. However, such values for T and $K_i$ should not be considered limiting.

With this in mind, a first article, Article 1, can include the following text: "I am a woman living in Yokohama. Yesterday, my doctor told me . . . . The doctor advised . . . ."

The term frequency of the term "woman" in Article 1 is 1, and the term frequency of the term "doctor" in Article 1 is 2. The "is-a" pattern frequency of the term "woman" in Article 1 is 1, and the "is-a" pattern frequency of the term "doctor" in Article 1 is 0. Therefore, a first ratio $r_1$ corresponding to the term "woman" in Article 1 is 1/1, or 1, and a second ratio $r_2$ corresponding to the term "doctor" in Article 1 is 0/2, or 0. Since $r_1$ is greater than T and $r_2$ is less than T in Article 1, $K_1$ can be assigned a high value and $K_2$ can be assigned a low value. For example, $K_1=5$ and $K_2=1$.

As another example, an Article 2 can include the following text: "Hi. I am a doctor working at a large hospital. I want to know whether you know a woman with a specific disease . . . . An article describing the disease of a woman . . . ."

The term frequency of the term "woman" in Article 2 is 2, and the term frequency of the term "doctor" in Article 2 is 1. The "is-a" pattern frequency of the term "woman" in Article 2 is 0, and the "is-a" pattern frequency of the term "doctor" in Article 2 is 1. Therefore, a first ratio $r_1$ corresponding to the term "woman" in Article 2 is 0/2, or 0, and a second ratio $r_2$ corresponding to the term "doctor" in Article 1 is 1/1, or 1. Since $r_1$ is less than T and $r_2$ is greater than T in Article 2, $K_1$ can be assigned a high value and $K_2$ can be assigned a low value. For example, $K_1=1$ and $K_2=5$.

At block 450, a query for obtaining question-answer data relevant to the user is received, and a data structure including question-answer data is output based at least in part on the personalization score of each question-answer article in satisfaction of the query. The question-answer data can be obtained by accessing the one or more question-answer databases described above herein, or from another question-answer database. In one embodiment, the data structure includes a structured question article table. The output can include summarized question titles associated with question-answer articles having personalization scores that exceed a threshold value. The summarized question titles can be prioritized in ascending or descending order based on their respective personalization scores. Additionally, the summarized question titles can be output by question type (e.g., "who", "what", "when", "why" or "how").

At block 460, feedback to refine the output can be received. For example, the feedback can include one or more new profile keywords that are not currently in the profile for the user. The one or more new profile keywords can then be added to the profile for the user. Since the addition of one or more new profile keywords can correspond to one or more new profile keyword scores, the addition of the one or more new profile keywords can have an impact on the personalization score for each question-answer article, which can affect the question-answer data output in response to receiving another query for obtaining question-answer data relevant to the user.

At block 470, access to one or more question-answer articles can be provided to the user. For example, the one or more question-answer articles can be provided as one or more electronic document attachments of an electronic message (e.g., e-mail or instant message) sent to the user. As another example, access to one or more question-answer articles can be provided via one or more hyperlinks sent via an electronic message to the user. The one or more hyperlinks can provide access to one or more web pages over the Internet. The one or more electronic document attachments and/or the one or more hyperlinks can be automatically generated for one or more question-answer articles having the highest personalization score(s), which can then be automatically forwarded to the user via an electronic message, or sent manually to the user via a third party.

Figure 5:
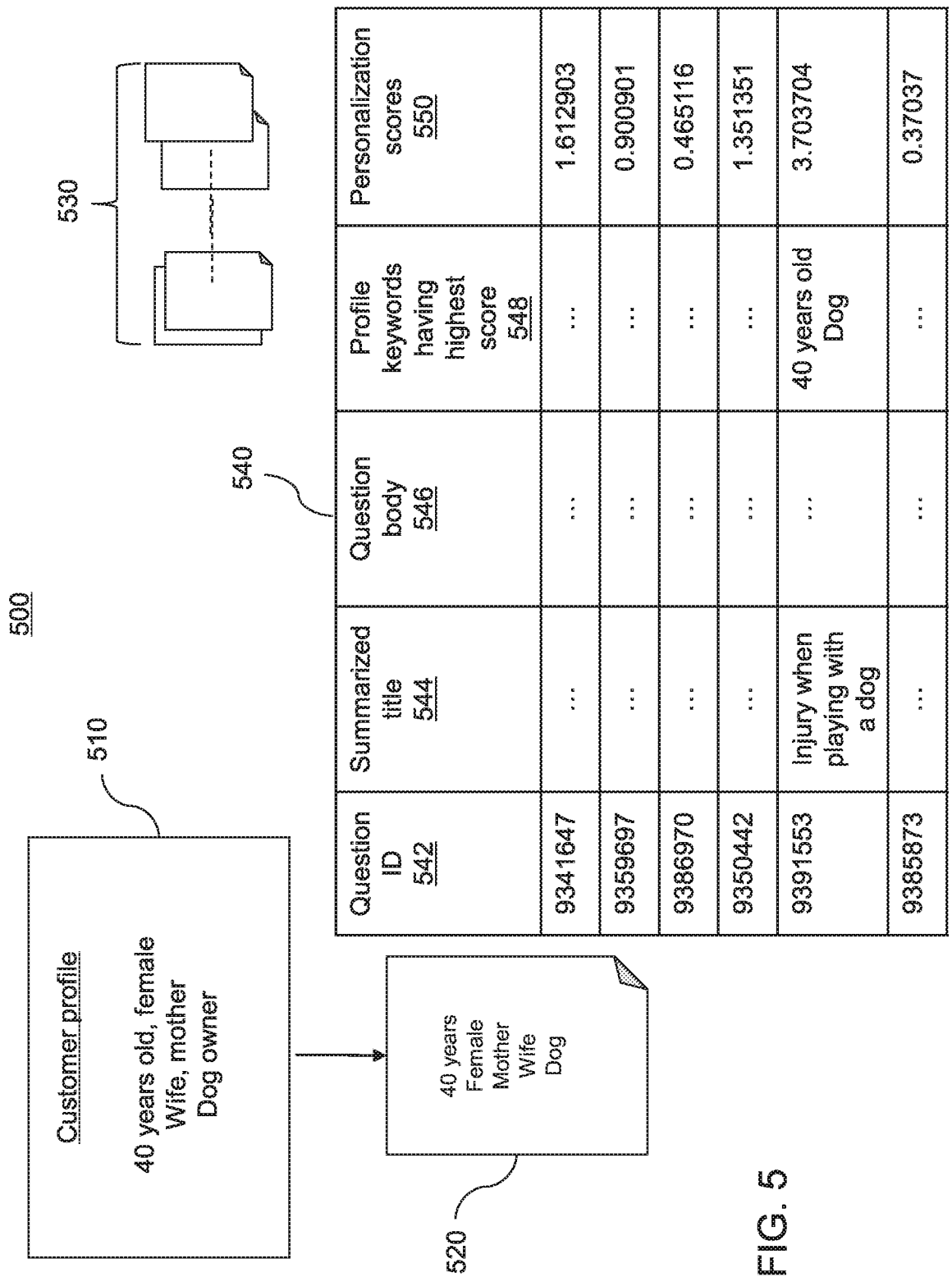
FIG. 5 is a diagram of an illustrative example of implementing the system/method of FIG. 4, in accordance with an embodiment of the present invention.

With reference to FIG. 5, a use case 500 illustrating the implementation of a system/method for constructing and searching structured data of question sentences in a question-answer database using machine learning and natural language processing, such as the system/method of FIG. 4, is provided.

In this scenario, an insurance salesperson makes an initial call to a customer as an introduction. Some personal information about the customer can be obtained from this initial call, such as, e.g., gender. It is assumed for purposes of this illustrative example that the customer is female. The insurance salesperson then asks to meet with the customer as a way of obtaining more profile keywords for the profile. During this meeting, the insurance salesperson learns more personal information about the customer. For example, the insurance salesperson learns that the customer is a dog owner, and finds out that the customer is a 40 year old mother. The insurance salesperson then adds this information, as well as the personal information obtained during the initial phone call, to a profile 510. The profile 510 is input, and profile keywords are extracted from the profile 510 to generate a list of profile keywords 520 corresponding to the customer.

A set of question-answer articles 530 located on a healthcare domain of a question-answer website is received as input. For each question-answer article of the set of question-answer articles 530, the question is summarized and a personalization score is calculated based on the profile keywords in the list of profile keywords 520 (e.g., 40 years old, female, mother, dog), such as in the manner described above with reference to FIG. 4. This can be done in order to identify which articles in the set of question-answer articles 530 may be of particular interest to the customer, which can allow the insurance salesperson to identify possible topics of conversation during a follow up call with the customer.

A data structure 540 including data related to question-answer articles is output. In this illustrative embodiment, the data structure 540 includes a structured question article table. As shown, the data structure 540 can include article ID numbers 542, summarized title 544 and question body 546 (e.g., title and question text), profile keywords having high score (e.g., 5) 548, and personalization scores 550. The personalization scores 550 can be dynamically generated for the list of profile keywords 520, such as via the system/method described above with reference to FIG. 4.

As shown, a question-answer article having article ID number 9391553 is illustratively described, which relates to an injury sustained when playing with a dog, has the highest personalization score for the customer. The corresponding summarized title is "Injury when playing with a dog," and the question body 546 for this question is, "Hi, I am 50 years old and an owner of a large dog. At a park, my dog suddenly pulled me and I am now terribly injured. My doctor advised me that I should stay in a hospital for two weeks. I want to know how to care for my dog when staying in the hospital." The profile keywords having the highest score corresponding to article ID number 9391553 are "40 years old" and "Dog"

The question-answer article having article ID number 9391553 has a personalization score of 3.703704, which is the highest personalization score determined for the customer. This indicates a high likelihood that a the customer will be interested in the question corresponding to article ID number 9391553. The insurance salesperson can discuss this article (among possibly others) with the customer in order to discuss possible insurance products that the customer can purchase. For example, if the customer thinks that an injury can result from playing with her dog, the customer may be interested in purchasing an insurance product that can cover such an injury.

The insurance salesperson can interact with the customer online (e.g., through e-mail, instant messaging and/or social media). For example, the insurance salesperson, besides discussing the article(s), can provide the article(s) to the customer as one or more electronic document attachments of an electronic message (e.g., e-mail or instant message). As another example, the insurance salesperson can provide the customer access to the article(s) by sending one or more hyperlinks to the customer via one or more electronic messages. The one or more hyperlinks can provide access to one or more web pages over the Internet. The one or more electronic document attachments and/or the one or more hyperlinks can be automatically generated for one or more question-answer articles having the highest personalization score(s), which can then be automatically forwarded to the customer electronically via one or more electronic messages, or sent manually by the insurance salesperson to the customer.

With reference to FIG. 6, a diagram is provided illustrating an exemplary system 600 for constructing and searching structured data of question sentences in a question-answer database. As shown, the system includes one or more processing devices (e.g., one or more servers) 610, at least one question-answer database (DB) 620, and at least one computing device 630. In this illustrative example, the computing device 630 is embodied as a personal computer. However, the computing device 630 can be any suitable computing device in accordance with the embodiments described herein. For example, the computing device 630 can be a mobile phone, laptop, PDA, etc.

The one or more processing devices 610 are configured to receive one or more question-answer articles as input from the at least one question-answer database 620. The one or more processing devices 610 are configured to summarize the title of each of the one or more question-answer articles using natural language processing techniques. The one or more processing devices 610 are configured to extract one or more profile keywords from a profile associated with a user. The computing device 630 can be associated with the user. The one or more processing devices 610 are configured to assign a personalization score corresponding to the user to each of the one or more question-answer articles based on the one or more profile keywords. The one or more processing devices 610 are configured to receive a query for obtaining question-answer data relevant to the user (e.g., from the computing device 630), and output a data structure including question-answer data based at least in part on the personalization score of each question-answer article in satisfaction of the query. The one or more processing devices 610 are configured to receive feedback to refine the output. The one or more processing devices 610 are configured to provide access to one or more question-answer articles to the user (e.g., as electronic document attachments of an electronic message and/or one or more hyperlinks accessible via computing device 630). Further details regarding FIG. 6 are described above with reference to FIGS. 4-5.

Having described preferred embodiments of constructing and searching structured data of question sentences in a question-answer database using machine learning and natural language processing (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed:

1. A system for constructing and searching structured data of question sentences in a question-answer database using machine learning and natural language processing, comprising:
    a memory device for storing program code; and
    at least one processor operatively coupled to the memory device and configured to execute program code stored on the memory device to:
        receive one or more question-answer articles as input from one or more question-answer databases over at least one network;
        extract one or more profile keywords from a profile associated with a user;
        assign a personalization score corresponding to the user to each of the one or more question-answer articles based on the one or more profile keywords by applying a morphological and dependency analysis to a body section of the question-answer article; and
        in response to receipt of a query for obtaining question-answer data relevant to the user, output a data structure including a structured question article table having question-answer data based at least in part on the personalization score of each question-answer article in satisfaction of the query.

2. The system of claim 1, wherein the at least one processor is further configured to summarize a title of each of the one or more question-answer articles by applying a morphological and dependency analysis to the title.

3. The system of claim 1, wherein the at least one processor is configured to assign the personalization score to a given one of the one or more question-answer articles by:
    calculating a ratio of a frequency of "is-as" pattern cases to a frequency of total cases for each profile keyword found in the body section of the given question-answer article;
    assigning a profile keyword score to each profile keyword found in the body section of the given question-answer article based on the corresponding ratio; and
    summing each profile keyword score to determine the personalization score assigned to the given question-answer article.

4. The system of claim 3, wherein the at least one processor is further configured to assign the profile keyword score to each profile keyword found in the body section of the given question-answer article based on a comparison of the ratio to a threshold value.

5. The system of claim 1, wherein the at least one processor is further configured to receive feedback to refine the output by receiving one or more new profile keywords not currently in the profile for the user.

6. The system of claim 1, wherein the at least one processor is further configured to provide access to one or more question-answer articles to the user.

7. A computer-implemented method for constructing and searching structured data of question sentences in a question-answer database using machine learning and natural language processing, comprising:
    receiving one or more question-answer articles as input from one or more question-answer databases over at least one network;
    extracting one or more profile keywords from a profile associated with a user;
    assigning a personalization score corresponding to the user to each of the one or more question-answer articles based on the one or more profile keywords, including applying a morphological and dependency analysis to a body section of the question-answer article;

receiving a query for obtaining question-answer data relevant to the user; and outputting a data structure including a structured question article table having question-answer data based at least in part on the personalization score of each question-answer article in satisfaction of the query.

8. The method of claim 7, further comprising summarizing a title of each of the one or more question-answer articles by applying a morphological and dependency analysis to the title.

9. The method of claim 7, wherein assigning the personalization score to a given one of the one or more question-answer articles includes:

calculating a ratio of a frequency of "is-as" pattern cases to a frequency of total cases for each profile keyword found in the body section of the given question-answer article;

assigning a profile keyword score to each profile keyword found in the body section of the given question-answer article based on the corresponding ratio; and summing each profile keyword score to determine the personalization score assigned to the given question-answer article.

10. The method of claim 9, wherein the profile keyword score is assigned to each profile keyword found in the body section of the given question-answer article based on a comparison of the ratio to a threshold value.

11. The method of claim 7, further comprising receiving feedback to refine the output, including receiving one or more new profile keywords not currently in the profile for the user.

12. The method of claim 7, further comprising providing access to one or more question-answer articles to the user.

13. A computer program product comprising a non-transitory computer readable storage medium having program instructions embodied therewith, the program instructions executable by a computer to cause the computer to perform a method for constructing and searching structured data of question sentences in a question-answer database using machine learning and natural language processing, the method performed by the computer comprising:

receiving one or more question-answer articles as input from one or more question-answer databases over at least one network;

extracting one or more profile keywords from a profile associated with a user;

assigning a personalization score corresponding to the user to each of the one or more question-answer articles based on the one or more profile keywords, including applying a morphological and dependency analysis to a body section of the question-answer article;

receiving a query for obtaining question-answer data relevant to the user; and outputting a data structure including a structured question article table having question-answer data based at least in part on the personalization score of each question-answer article in satisfaction of the query.

14. The computer program product of claim 13, wherein the method further includes summarizing a title of each of the one or more question-answer articles by applying a morphological and dependency analysis to the title.

15. The computer program product of claim 13, wherein assigning the personalization score to a given one of the one or more question-answer articles includes:

calculating a ratio of a frequency of "is-as" pattern cases to a frequency of total cases for each profile keyword found in the body section of the given question-answer article;

assigning a profile keyword score to each profile keyword found in the body section of the given question-answer article based on the corresponding ratio; and summing each profile keyword score to determine the personalization score assigned to the given question-answer article.

16. The computer program product of claim 15, wherein the profile keyword score is assigned to each profile keyword found in the body section of the given question-answer article based on a comparison of the ratio to a threshold value.

17. The computer program product of claim 13, wherein the method further includes receiving feedback to refine the output, including receiving one or more new profile keywords not currently in the profile for the user.

18. The computer program product of claim 13, wherein the method further includes providing access to one or more question-answer articles to the user.

* * * * *